Figure 1:
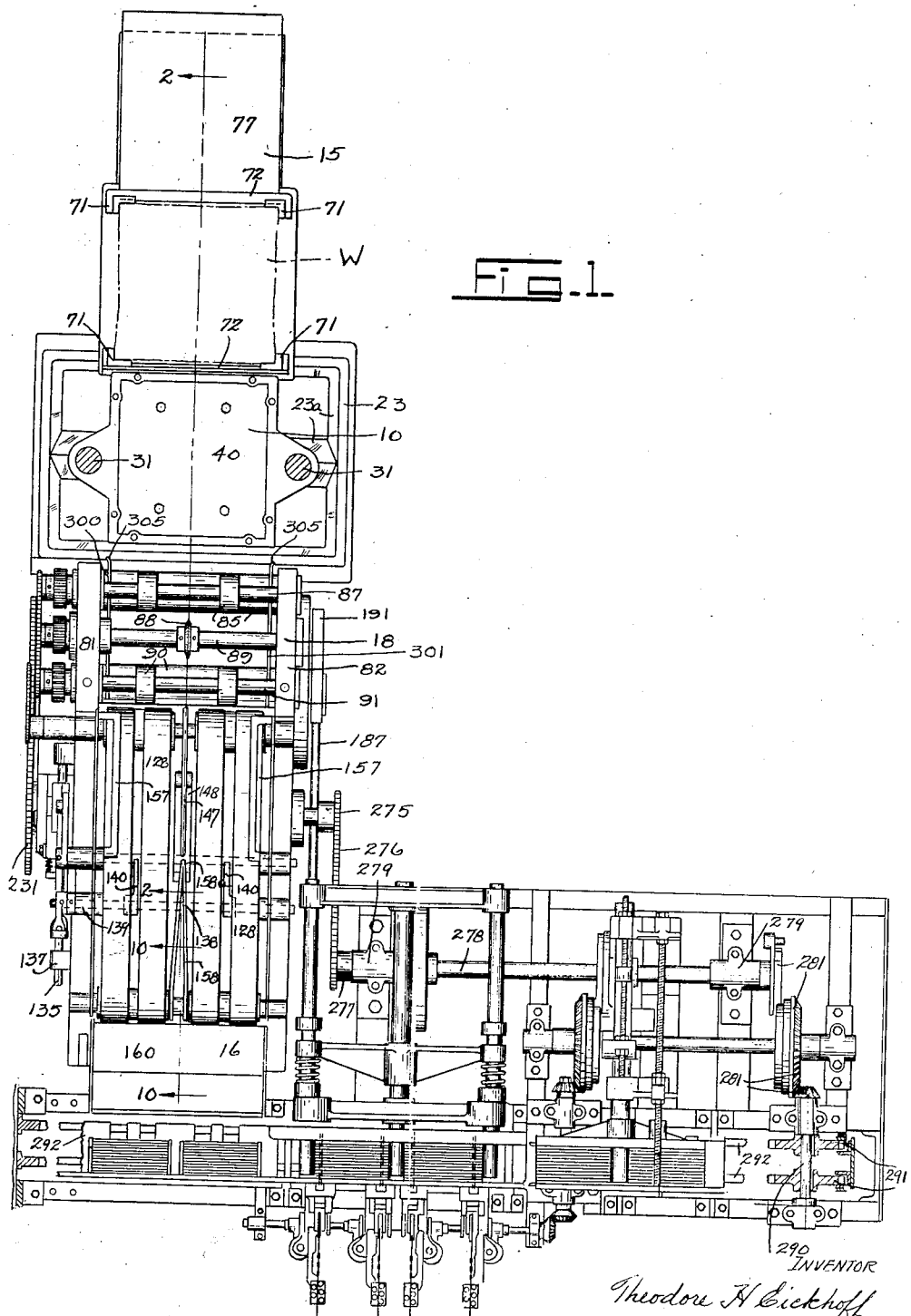

Jan. 12, 1932.    T. H. EICKHOFF    1,841,018
SLAB FORMING AND STACKING MECHANISM
Original Filed Jan. 12, 1929    8 Sheets-Sheet 1

INVENTOR
Theodore H Eickhoff
By Bates, Golrick & Tease
ATTORNEYS

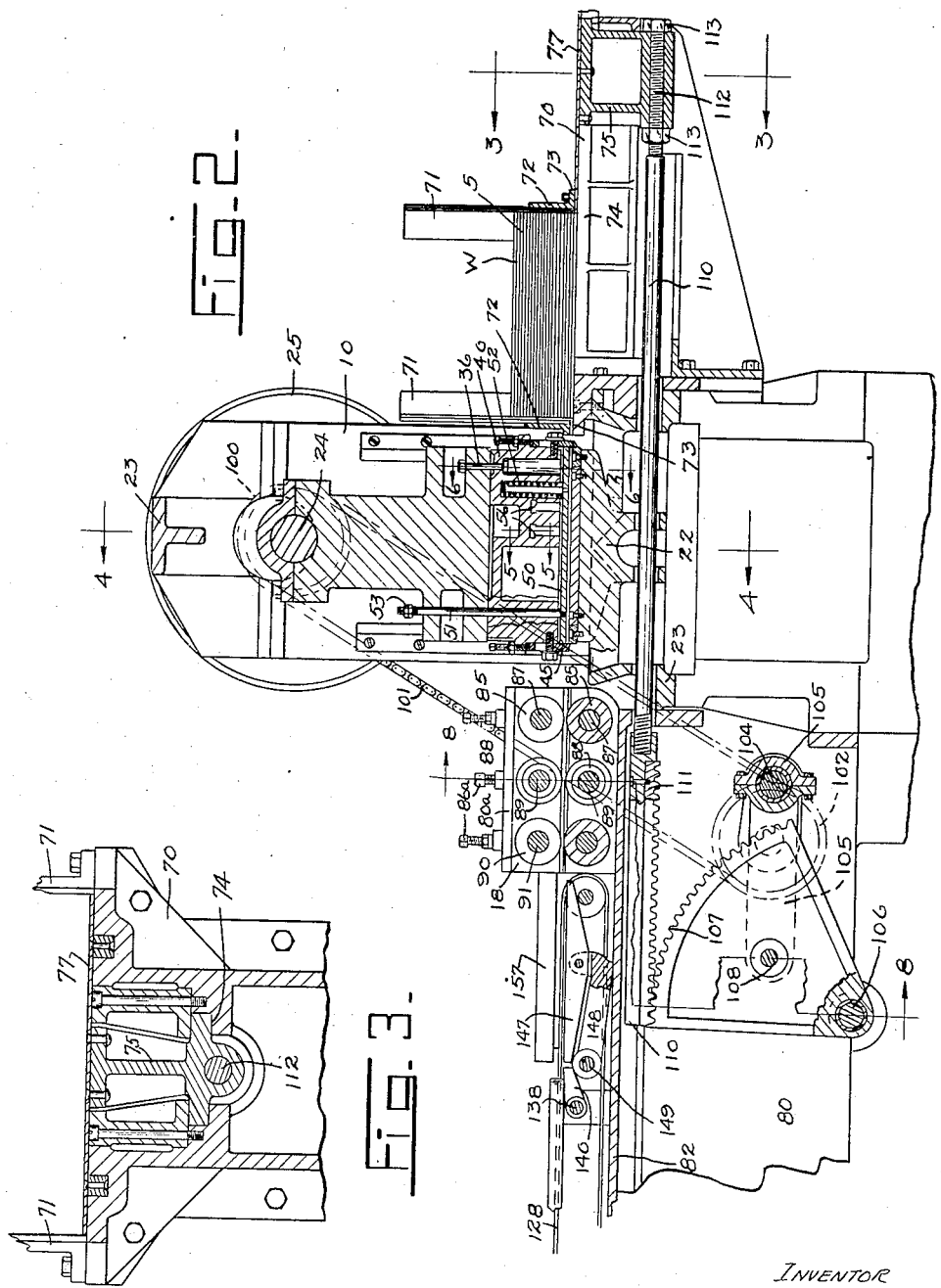

Jan. 12, 1932.  T. H. EICKHOFF  1,841,018
SLAB FORMING AND STACKING MECHANISM
Original Filed Jan. 12, 1929   8 Sheets-Sheet 3
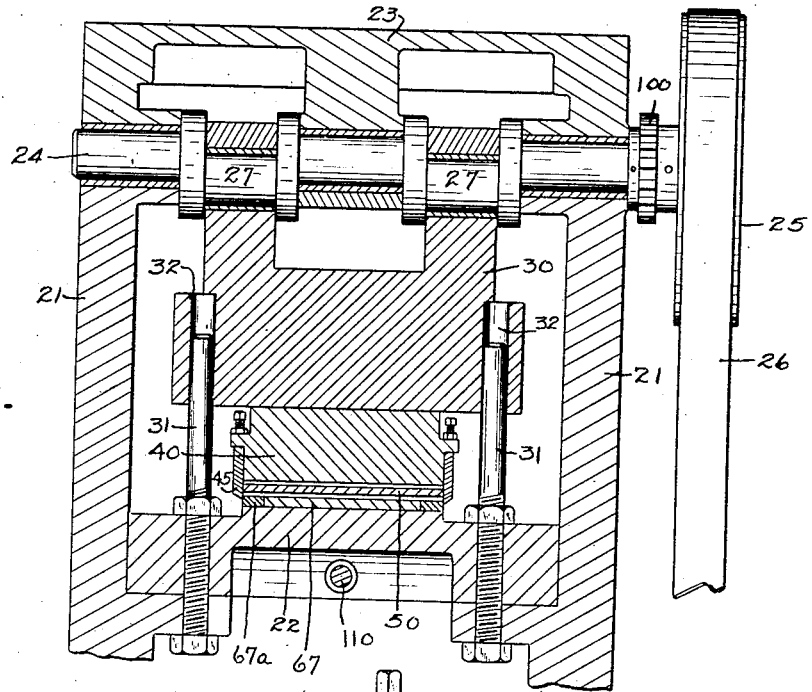
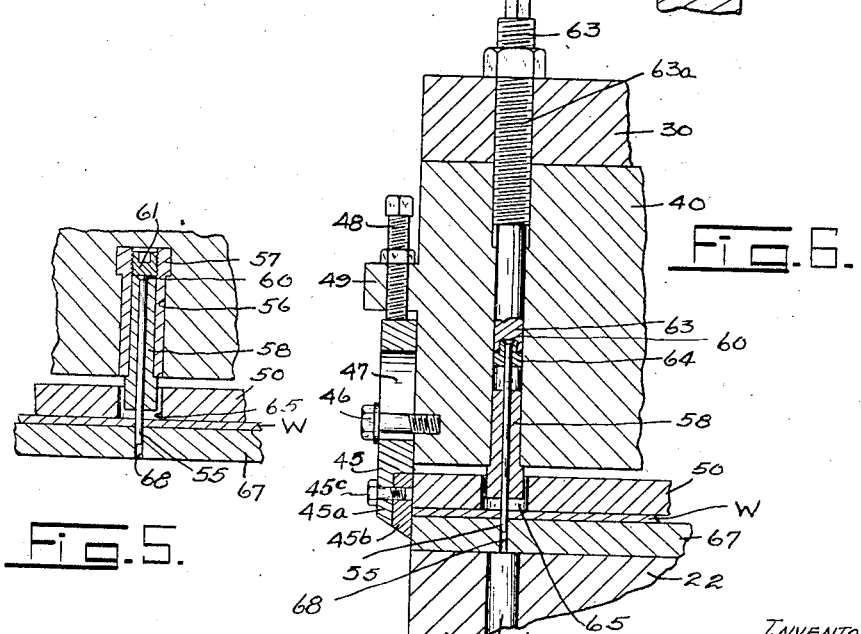
INVENTOR
Theodore H. Eickhoff
By Bates, Golrick & Teare
ATTORNEYS Jan. 12, 1932.　　　T. H. EICKHOFF　　　1,841,018
SLAB FORMING AND STACKING MECHANISM
Original Filed Jan. 12, 1929　　8 Sheets-Sheet 4
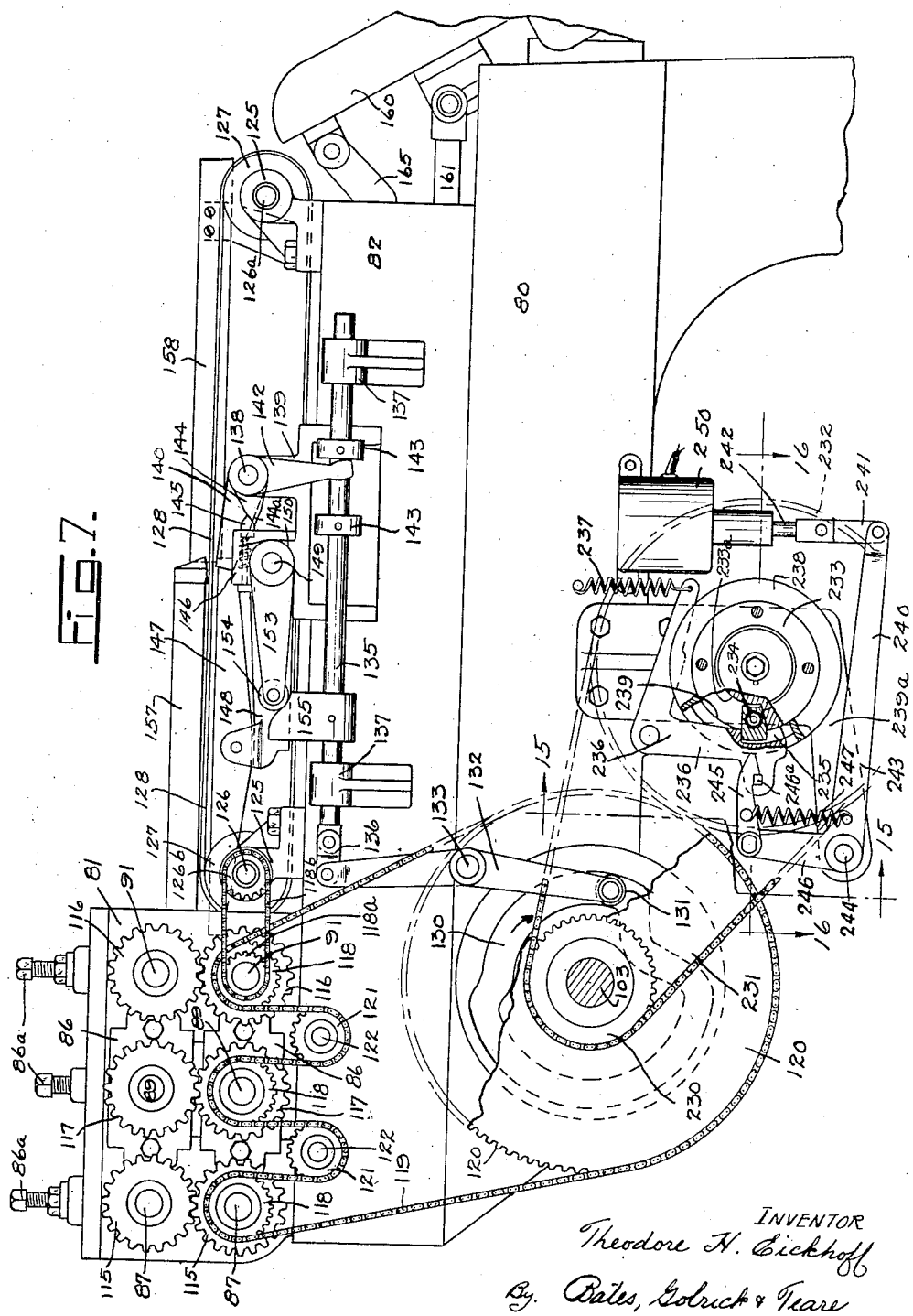
INVENTOR
Theodore H. Eickhoff
By Bates, Golrick & Teare
ATTORNEYS Jan. 12, 1932. T. H. EICKHOFF 1,841,018
SLAB FORMING AND STACKING MECHANISM
Original Filed Jan. 12, 1929    8 Sheets-Sheet 5

INVENTOR
Theodore H. Eickhoff
By Bates, Gobrick & Teare
ATTORNEYS.

Jan. 12, 1932.  T. H. EICKHOFF  1,841,018
SLAB FORMING AND STACKING MECHANISM
Original Filed Jan. 12, 1929  8 Sheets-Sheet 6
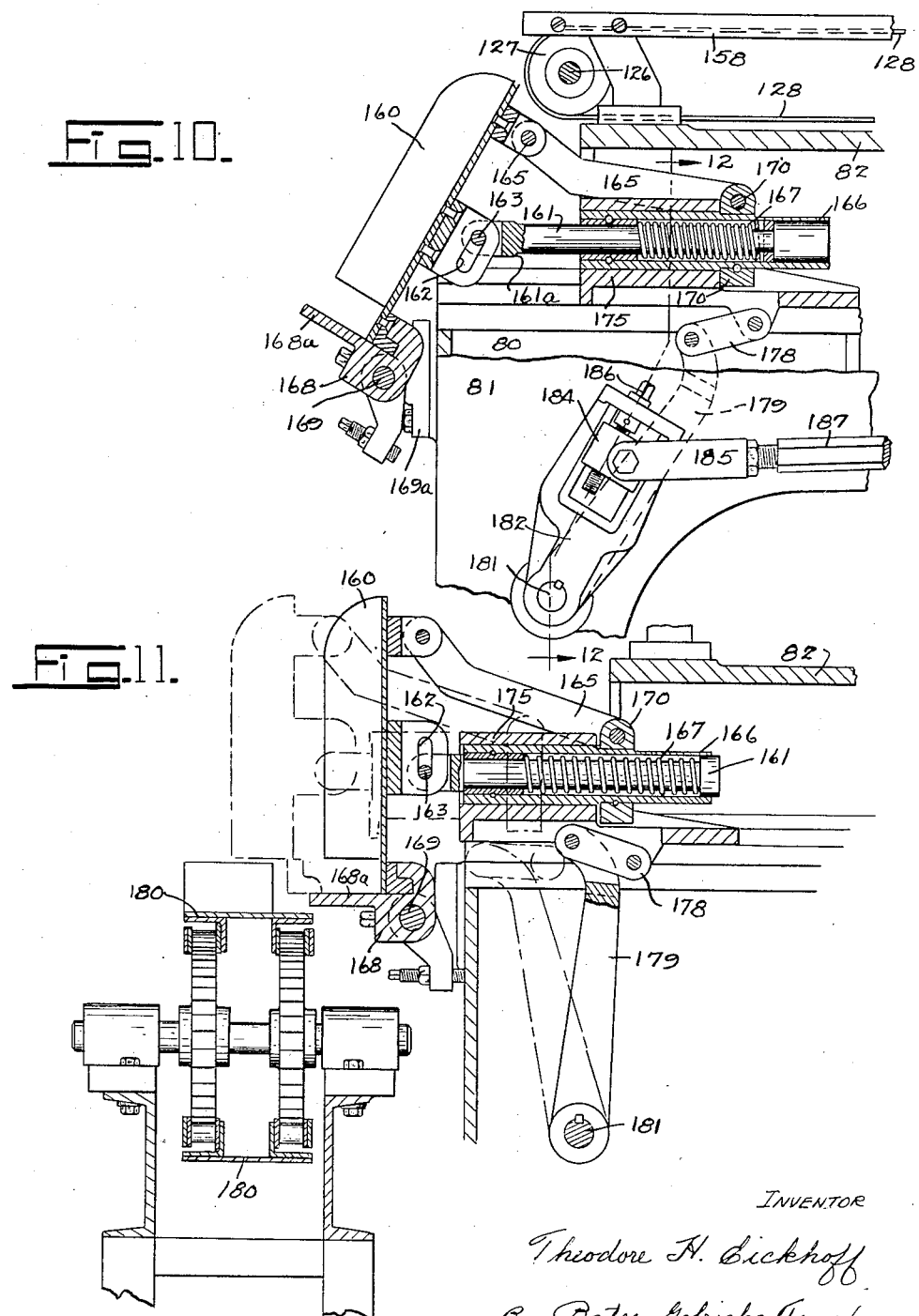
INVENTOR
Theodore H. Eickhoff
By Bates, Golrick & Teare
ATTORNEYS Jan. 12, 1932.　　　T. H. EICKHOFF　　　1,841,018

SLAB FORMING AND STACKING MECHANISM

Original Filed Jan. 12, 1929　　8 Sheets-Sheet 7

Inventor

Theodore H. Eickhoff.

By Bates, Golrick & Teare

Attorneys

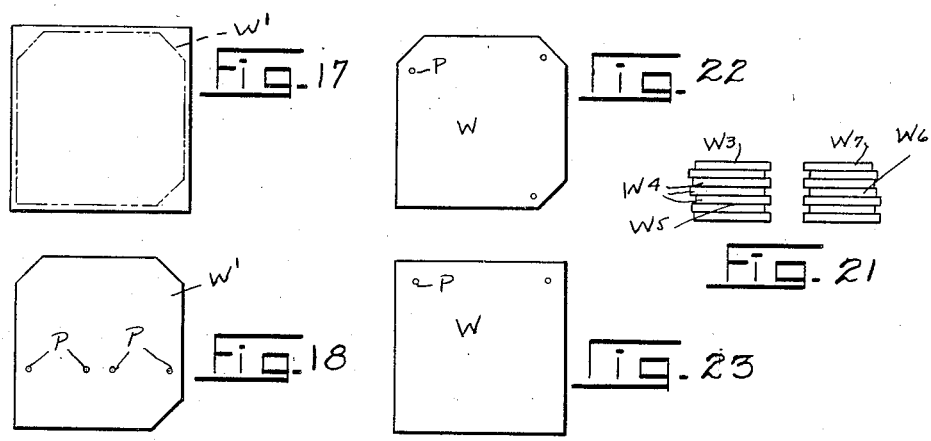
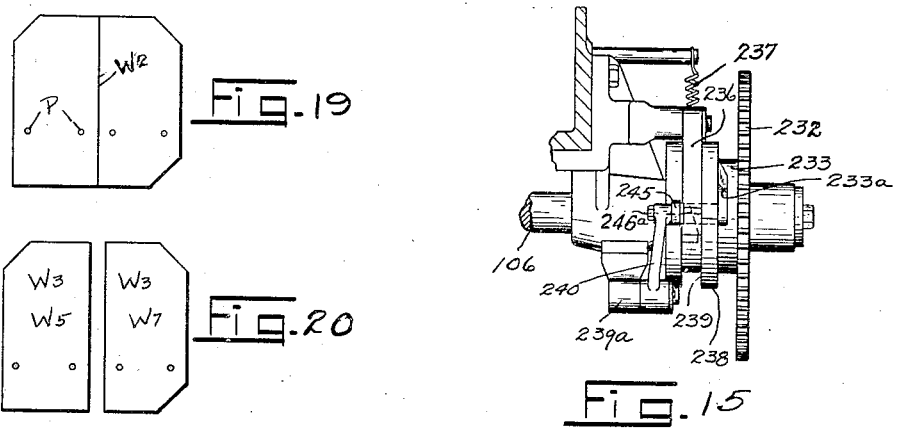
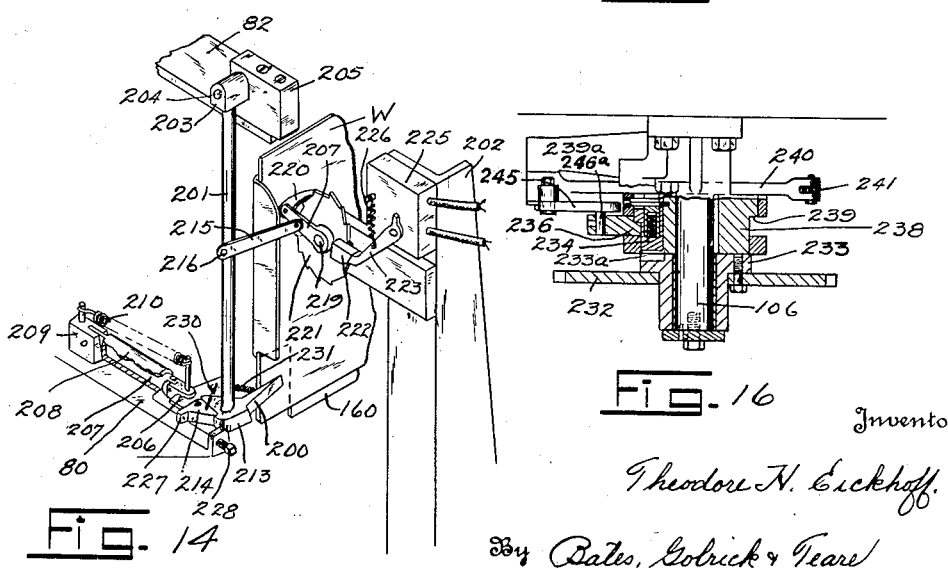

Patented Jan. 12, 1932

1,841,018

UNITED STATES PATENT OFFICE

THEODORE H. EICKHOFF, OF CLEVELAND HEIGHTS, OHIO, ASSIGNOR TO THE PHILIP CAREY MANUFACTURING COMPANY

SLAB FORMING AND STACKING MECHANISM

Original application filed January 12, 1929, Serial No. 332,146. Divided and this application filed March 13, 1930. Serial No. 435,501.

This invention relates to an apparatus for cutting, trimming and stacking slab materials, such as composition shingles and the like. The present application constitutes a division of my application for Letters Patent on a slab forming and bundling apparatus, Serial No. 332,146, filed January 12, 1929.

The general object of this invention is to provide an apparatus which will effectively cut, perforate, and trim slab materials to required dimensions.

One of the objects of my invention is to provide an apparatus which will feed slabs of material to a cutting and perforating mechanism adapted to size, perforate, and divide the slabs into a plurality of finished units.

Another object is to provide an apparatus which will stack a predetermined number of products with precision and without marring or mutilating the products.

Another object is to provide an apparatus which will divide the trimmed slabs into a plurality of finished units, or products, without causing loss of material or necessitating the use of a complicated trimming and perforating press.

One of the features of my invention is that I provide an apparatus which is continuous in operation and is operated from a single source of power, to effect the trimming, perforating and dividing of slab material into finished units and thereafter stack the units in stacks of a predetermined unit content.

A further object of this invention is the provision of an apparatus which will trim, perforate, score and thereafter split a slab into a plurality of units.

Another object is to provide an apparatus which will score and split a slab of material into a plurality of units, wherein one unit may differ in size or shape from other units split from the same slab.

Another object is to provide an apparatus which will score and split slab material into a plurality of units and thereafter stack the units, each stack containing units split from the same relative position in the slabs.

Further objects of this invention will become apparent from the following description of a preferred embodiment, which is illustrated in the drawings, and the essential characteristics are summarized in the claims.

Figure 8:
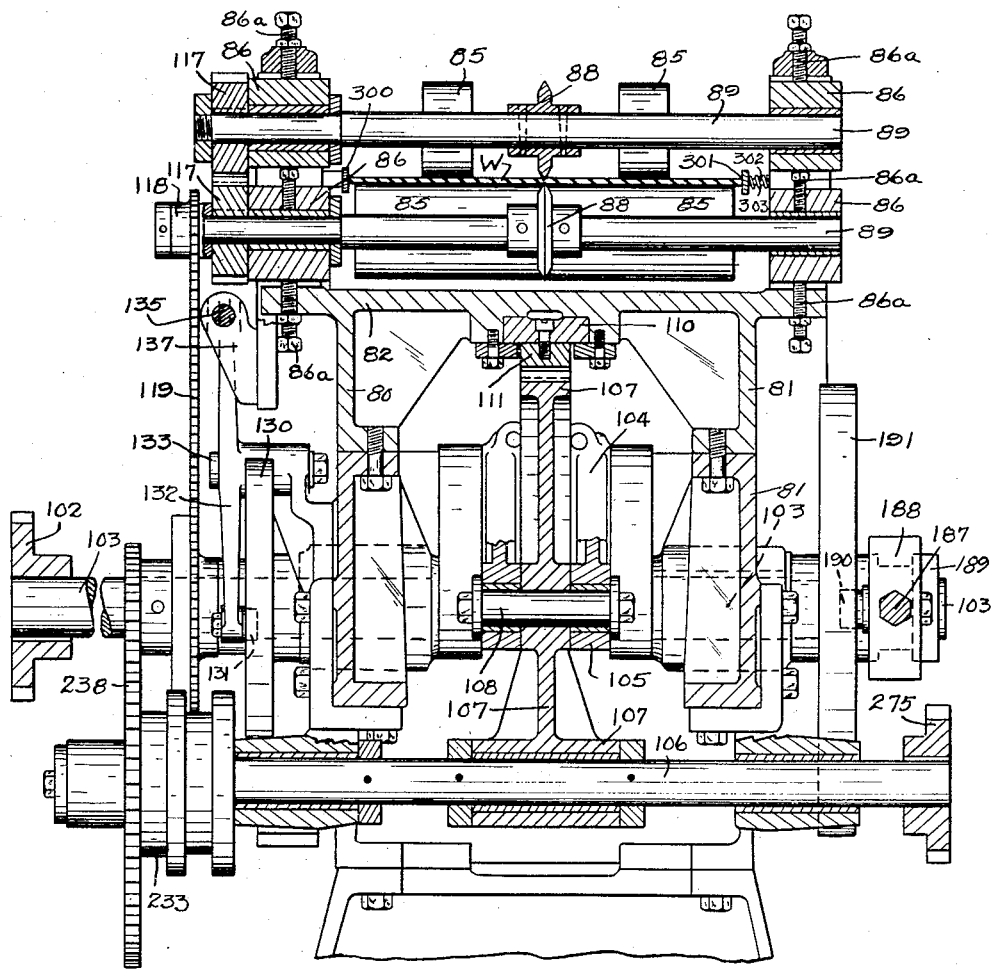
Figure 9:
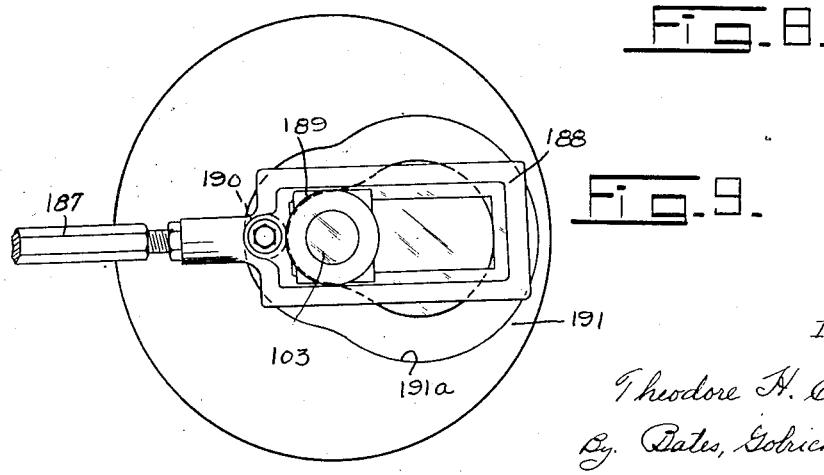
Figure 12:
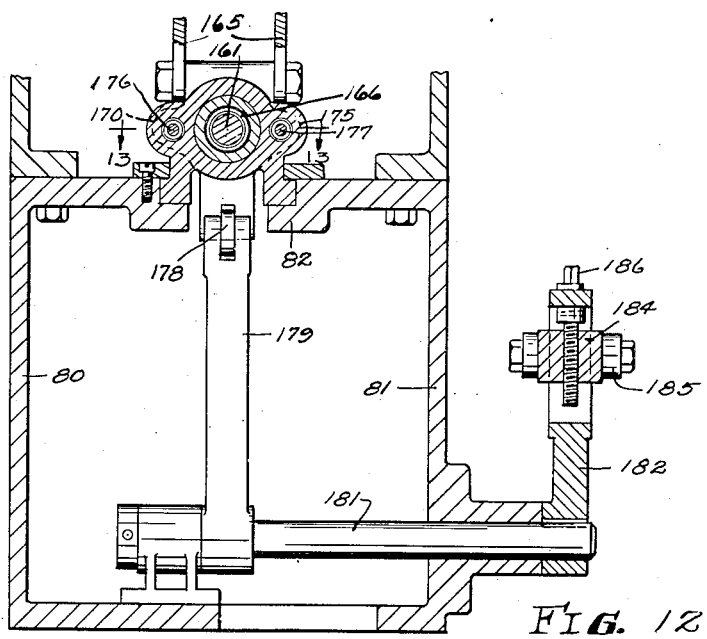
Figure 13:
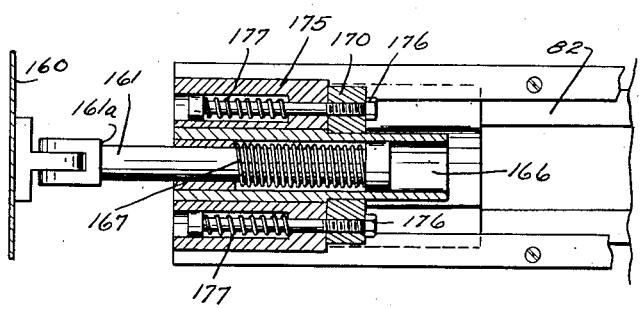

In the drawings, Fig. 1 is a plan of a machine embodying my invention; Fig. 2 is a vertical section and is indicated by the lines 2—2 in Fig. 1; Fig. 3 is a vertical transverse section taken through the slab feeding mechanism, and is indicated by the lines 3—3 on Fig. 2; Fig. 4 is a horizontal transverse section through the forming mechanism and is indicated by the lines 4—4 on Fig. 2; Figs. 5 and 6 are horizontal sections on an enlarged scale, being details of the perforating mechanism, and are indicated by the lines 5—5, and 6—6 in Fig. 2; Fig. 7 is a side elevation partially broken away, looking from the left of Fig. 2, and illustrates the driving, scoring and splitting mechanism; Fig. 8 is a horizontal, transverse section through the scoring mechanism and is indicated by the offset line 8—8 in Fig. 2; Fig. 9 is a side elevation of the mechanism which controls the stacking; Fig. 10 is a vertical longitudinal section through the stacking mechanism, and is indicated by the lines 10—10 in Fig. 1; Fig. 11 is a section taken in the same plane as Fig. 10 and illustrates the parts in different positions; Fig. 12 is a vertical section and is indicated by the offset lines 12—12 in Fig. 10; Fig. 13 is a horizontal section and is indicated by the lines 13—13 in Fig. 12; Fig. 14 is a perspective view of the counting mechanism; Fig. 15 is a vertical section and is indicated by the lines 15—15 in Fig. 7; Fig. 16 is a horizontal section and is indicated by the lines 16—16 in Figs. 7 and 12; Figs. 17 to 21 inclusive, are diagrammatic illustrations of the slab in different stages of progress; Figs. 22 and 23 illustrate different forms of product, for which my machine is used.

This invention contemplates the provision of a machine adaptable for the formation of shingles from composition sheet material, such as asbestos board, and the like. Shingles formed of such materials may have various shapes, and may be perforated in the course of manufacture, whereby the shingle units, when ultimately used, may be attached to a building construction by suitable securing means, which extends through the perforations. In the form of the invention shown, I provide a chain of coordinated mechanisms which may be utilized to effect the cutting of slabs of material into product units, or, if desired, shingle units of approximate dimension may be passed through the apparatus to be properly sized and perforated. The present apparatus is adaptable to the finishing or forming of shingles of various shapes and sizes.

In the drawings the cutting, perforating and trimming mechanism is generally indicated at 10; a suitable bundling mechanism, which is described and claimed in my copending application, is generally indicated at 20; the mechanism which conveys the slabs to the trimming and perforating mechanism is generally indicated at 15; the slab scoring mechanism is generally indicated at 18; the slab splitting mechanism is generally indicated at 19, and the stacking mechanism is generally indicated at 16.

The mechanism used to trim, perforate and cut the shingles, as shown in Figs. 1, 2, 3, 4, 5 and 6, will now be described. This mechanism or press comprises upright frame members 21, having suitable cross members 23, which support a bed 22. Journalled in the frame members 21, above the bed, is a crank shaft 24, having crank arms 27. Operatingly connected to the crank arms 27, is a head 30, mounted for reciprocation above the bed 22 in the frame members 21.

The head 30 is guided by means of stationary plungers 31, rigidly secured to the base or bed 22 and which register with cylindrical openings 32 in the head 30, as illustrated in Fig. 4. The shaft 24 carries a pulley 25, which may be driven by a belt 26 from any suitable source of power, such as a motor (not shown).

A die block 40 is secured to the underside of the head 30 by suitable bolts 36. The die block carries shear members 45 and punch members 55. The shears or trimming knives 45 are adjustably mounted on the block 40 by bolts 46 which pass through slotted openings 47 in the shear. Suitable adjusting screws 48, mounted in ears 49, projecting outwardly from the die block 40, maintain accurate vertical adjustment of the shear blades. If it is desired to facilitate replacement of the cutting edges, each shear may comprise a holder 45a to which a knife or shear blade 45b may be secured by bolts 45c.

An ejector plate 50 is mounted below the die block 40 and within the confines of the shears 45. The ejector plate is normally forced downwardly by springs 52 contained in recesses in the die block 40. The downward movement of the ejector plate is limited by adjusting nuts 53 on bolts 51, rigidly secured to the ejector plate and slidably mounted in the die block 40. On the upward stroke of the head, the springs 52 force the ejector plate downward and ejects any material which has remained gripped between the shear blades.

The punch members 55 may be mounted in the cutting of slabs of material into product trated in Figs. 2 and 5, the head 40 is provided with a T-shaped slot 56 in which a T-shaped block 57 is secured. Pressed in the block 57 are guides 58 which retain the punches 55. Each punch has a head 50, which seats in the uppermost end of the guide 57 and is retained in contact therewith by a threaded plug 61, carried by the block 57. This method of positioning the punch members permits them to be readily changed from one position to another in the slot without altering the die 40.

Fig. 6 illustrates a modified form of punch mounting. In this instance, the guide block 58 is pressed directly in the die 40, while the headed portion 60 of the punch is carried by a plug 64 and is retained in position therein by a bar 63, one end of which is threaded to the plug 64. The bar 63 is retained in the die 40 by a threaded portion 63a. In this construction the punch 55 may be vertically adjusted, or any particular punch may be raised so as to prevent its contact with the slab or work W. The ejector plate 50 has suitable openings 65 to provide for the operation of the punches, and should the work adhere to the punch, the ejector will force it downward until it clears the punch.

The mechanism which feeds the rough slabs W to the forming and perforating mechanism, comprises a table 70, which is supported by the frame members 21 and extends to the rear thereof (Figs. 1, 2 and 3). Mounted on this table is a magazine for the rough slabs. The magazine comprises upright corner members 71 having suitable cross bars 72 adapted to retain a stack of material. The members 71 are cut away adjacent their lowermost ends, as at 73, to permit the bottommost slab W to be pushed from the stack and retain the remaining slabs within the magazine.

To propel the slab forwardly, (to the left in Fig. 3), the table 70 is provided with a slideway 74 in which a carriage 75 is reciprocated, by means to be hereinafter described. Mounted on this carriage, and sliding on the table 70 is a plate 77, which is slightly less in thickness than one slab. The bottommost slab normally rests on the table 70 and as the plate is propelled forward, the slab is pushed from beneath the stack to a position under the die 40. The balance of the stack is then supported by the plate 77, and upon the return movement of the carriage (to the right in Fig. 3), the plate 77 is withdrawn from beneath the stack, permitting the latter to drop to normal position, and the plate 77 is then in position to carry the next slab forward.

While the feeding mechanism feeds the bottommost sheet, it is contemplated that the uppermost sheet could readily be fed by the same medium. It is further contemplated that the reciprocating movement, shown in the drawings, could be utilized to feed material from a roll as easily as to feed separate sheets from a stack.

The slab W is fed to the press, while the platen or head 30 is in a raised position. The slab is positioned, by the plate 77, on a lower die block 67, rigidly secured to the bed 22 of the press. If desired, the block 67 may have hardened edges 67a (see Figure 4), which coact with the shears 45 to trim the slab. The block or die member 67 is also provided with openings or female die members 68 to coact with the punches 55. The bed 22 is provided with openings 69, through which the punchings pass from the press.

After a sheet W is fed to position on the die 67, the press acts to trim and perforate the sheet. It will be noted that the upper surfaces of the frame members 23 are bevelled, as at 23a in Figs. 1 and 2, to readily permit the passing from the press of the strips which are trimmed from the slabs.

The splitting mechanism, which scores and breaks apart the formed slabs, is located immediately forward of the press (to the left in Fig. 2). I prefer to score and split the formed slab much in the manner one would score and split a pane of glass, in other words, by scoring the slab and then subjecting the scored slab to a sharp blow. I find this novel method most advantageous, in that it permits the material to be fed to the press in slabs sufficiently large to permit a plurality of units to be cut from each slab.

When a single action press is used to simplify the mechanism, a strip of material ordinarily is sacrificed or the severed edges of the completed units are uneven. However, I first form the slab in the press and later split the slab into a plurality of shingle units, thereby preventing waste of material and providing a product which has uniform edges. The splitting mechanism 18 is supported by a frame comprising side members 80 and 81 and suitable cross members 82. This frame supports a plurality of feeding rolls and cutting knives, as will be hereinafter described.

As a slab W is fed to the press, by reason of the reciprocation of the plate 77, it forces a previously trimmed slab from the press into the bite of upper and lower feed rolls 85, which are secured to shafts 87, carried by the frame members 80 and 81. The rolls 85 progress the slab (to the left, Fig. 2) to scoring knives 88 (Figs. 2 and 8). The scoring knives are, in the embodiment shown, rotary discs having knife edges 88a, and are rigidly secured to shafts 89 mounted on the frame members 80 and 81. These knives are arranged in pairs, one directly above the other, and score the slab on both the top and bottom sides. The knives progress the slab to a pair of feed rolls 90, mounted on shafts 91, rotatably supported by the frame members 80 and 81. This latter set of feed rolls deliver the scored sheet to a belt conveyor, 70 which will be hereinafter more fully described.

I prefer to accurately guide the trimmed slab through the feed rolls 85 and 90, and thereby cause the slab to be scored along a predetermined line with reference to the edges of the slab. As illustrated in Figs. 1 and 8, I rigidly secure a guide bar 300 to the frame member 80, at one side of the rolls, and in such a manner that the slabs will contact with the bar while entering and passing through the rolls. At the other side of the rolls, I provide a similar bar 301 having outwardly extending pins 302, which are slidingly mounted in the frame member 81. Suitable compression springs 303, mounted on the pins 302, urge the bar 301 towards the bar 300, thereby guiding the slab along the bar 300. To facilitate the entrance of the formed slab between the guides, I provide each bar with an outwardly curved portion 305.

I find it convenient to provide the feed rolls and scoring knives with a vertical adjustment, in order that different thicknesses of materials may be scored. Hence, each shaft, 87, 89 and 91, is journalled in blocks 86, adjustably mounted in the frames 80 and 81, and which are secured in an adjusted position by means of suitable adjusting screws 86a.

I will now describe the driving mechanism which drives the reciprocating feed 15 and the splitting mechanism 18. Pinned to the crank shaft 24 of the press is a sprocket 100, which, by means of a chain 101, drives a pulley 102, keyed to a crank shaft 103, which is journalled in the frame members 80 and 81. A connecting rod 105 is mounted on a crank arm 104 of the shaft 103 and is connected by a wrist pin 108 to a segmental gear 107. The segmental gear is mounted for oscillation on a shaft 106, which is journalled in the frame members 80 and 81. The rotation of the shaft 24, therefore, causes the oscillation of the segmental gear 107.

Mounted in a slideway 109, of the frame member 82, is a bar 110, which carries a rack 111 adapted to coact with the segmental gear 107. The bar 110 extends rearwardly (to the right, Fig. 2) beneath the press 10 and is secured to the feed carriage 75 by a threaded portion 112 of the bar and suitable clamping nuts 113.

The ratio of the gear 100 to the gear 102 is one to one. Therefore, it will be seen that the slide bar will cause the carriage 75 to be reciprocated once for each revolution of the press 10. This movement is so timed that when the press is in the inactive portion of its movement, the carriage is progressed forward to feed a sheet, and is partially withdrawn before the press enters on the active portion of its stroke. It is, therefore, apparent that a piece of work would be fed to the press and formed for each revolution of the crank shaft of the press.

Keyed to each of the shafts 87 are spur gears 117, meshing with each other and driving their respective feed rolls 85 at the same speed. The roller shafts 91 are likewise geared together by similar gears 116, while the cutter shafts 89 are similarly geared by means of spur gears 117. Keyed to the lowermost shaft of each pair 87, 89 and 91 (Fig. 7) are sprockets 118, which are driven by a chain 119, meshing with a sprocket 120, mounted on the shaft 103.

The gearing is such that the feed rolls are driven at a peripheral speed, which causes the rolls to progress the work faster than the feeding mechanism 15. This permits the movement of the scored slabs to be arrested in order that they may be split and accomplishes this without interruption of the press 10.

In order that a maximum amount of driving contact may be had between the chain 119 and the sprockets 118, I provide suitable idler sprockets 121 journalled on studs 122, mounted in the frame member 81.

To split the scored slabs so that they may be separated and stacked for bundling or other purposes, I provide the following mechanism. Mounted on the frame 82 are bearings 125, which carry shafts 126 and 126a. Rigidly secured to the shafts are rollers 127 adapted to carry horizontally extending conveyor belts 128, which convey the slabs discharged by the feed rolls 90, to the splitting mechanism. Rigidly secured to the shaft 126 is a sprocket 126b which is driven from a sprocket 118a, rigid with the lower shaft 91, by a suitable chain 118b. While the sheet is on the conveyor belts its progress is arrested and it is split and separated as hereinafter described.

Rigidly secured to the shaft 103 is a cam 130 (Figs. 1, 7 and 8) which coacts with a roller 131, mounted on the lower arm of a lever 132 pivoted to the frame member 82 at 133. The upper arm of the lever 132 is connected to a cam bar 135 by a link 136. The cam bar is slidably mounted in bearings 137, secured to the side frame member 82. A pair of spaced collars 143, rigidly secured to the bar 135 rock an arm 142, rigid with a shaft 138, mounted in bearings 139, rigidly secured to the frame member 82. Rigidly carried by the shaft 138, are stop fingers 140, which lie between the conveyor belts 128 and are normally in a plane below that of the scored slab. Hence, when the arm 142 is rocked, the shaft 138 swings the stop fingers 140 upwardly into the path of the slab and arrests its progress.

To retain the arm 142 in contact with one of the collars 143, as well as to expedite the movement of the stop fingers 140, I provide the lever 142 with an extending arm 144, having a bevelled nose 144a, adapted to coact with a spring pressed plunger 145, mounted in a bracket 146, secured to the frame 82. When the direction of operation of the bar 135 is to the left (in Fig. 7) the right hand collar 143 coacts with the lever 142 and swings the arm 144 until the bevelled nose 144a of the arm passes the vertex of the plunger. The spring 146 then causes the plunger to cam the arm 144a upwardly swinging the stop fingers into the path of the sheet. Then as the bar 135 returns the left hand collar will cause the mechanism to be returned.

While the slab is in an arrested position, a bar 147 is brought upwardly and delivers a sharp blow to the underside of the sheet, directly beneath the scored portion, thereby causing the sheet to split along the score. The bar is pivotally carried by a rock arm 148, pinned to a shaft 149, mounted in bearings 150 on the frame member 82. Rigidly connected to the shaft 149 is an arm 153, which carries a roller 154 adapted to be acted upon by a cam 155, mounted on the bar 135.

It is to be noted that the cam is so arranged, that when the bar 135 is forced rearwardly (to the right of Fig. 7) by reason of the cam 130, a rocking movement will be imparted to the shaft 149, causing the bar 147 to be raised upwardly and deliver a sharp blow to the sheet. To prevent upward movement of the sheet while it is being split, I provide bars 158, secured to the frame member 82 and which overlie the edges of the sheet.

After the splitting operation has been completed, the stop fingers 140 are withdrawn and the split slab units then continue to be carried by the conveyor 128. Rigidly secured to the frame of the machine and to the rear of the bar 147 is a V-shaped dividing plate 158. The dividing plate is so positioned that the nose 158a of the plate coacts with the split shingle to separate the divided units as they are carried by the conveyor belts 128 to a suitable discharge member.

The discharge member consists of a trough-shaped pan 160, which acts to stack the units on end and carry them to positions on a conveyor, adapted to carry them to a bundling mechanism, generally indicated at 20 in Figs. 1, 10, 11, 12, 13 and 14. The trough-shaped pan 160 is supported by a plunger 161 having a pin and slot connection 162—163 with the pan and by a link 165 one end of which is pivotally connected to the pan at 165a and the other end to a collar 170, secured to a cylinder 166, which carries the plunger 161. The cylinder 166 is mounted in a carriage 175, slidably mounted on the frame 82. The cylinder 166 is resiliently positioned in the carriage 175 by compression springs 177 mounted in the carriage and which coact with bolts 176 secured to the collar 170. A compression spring 167, mounted in the cylinder 166 surrounds the plunger 161 and draws the plunger rearwardly, bringing the lower portion of the pan 160 into contact with an arm 168, rockingly mounted on a shaft 169, carried by bearings 169a mounted on the frame 82.

As shown in Figs. 10, 11 and 13, the frame 175 is connected by means of a link 178 to a lever 179, rigidly carried by a rock shaft 181. A yoked arm 182, carried by the rock shaft 181, is rocked, as will hereinafter be described, and causes the movement of the frame 175. As the frame is drawn forward it forces the collar 170 and link 165 forward, thereby swinging the upper end of the trough-shaped member or pan 160 to an upright or vertical position, as illustrated in Fig. 11. The swinging movement of the arm 168 is arrested by the stud 170a contacting with the frame 82. The stud 170a is carried by an arm 171a, rigidly secured to the shaft 169. After the swinging movement of the carriage 166 is arrested, the carriage coacts with a shoulder 161a on the plunger 161 and carries the plunger forward in unison with the movement of the link 165, thereby carrying the pan 161 bodily forward to the position indicated in broken lines in Fig. 11. The products are discharged from the conveyor 128 to the pan 160 in such a manner that they rest endwise on a lip 168a of the arm 168 and as the trough 160 is progressed forward (to the left of Figs. 10 and 11), the product is pushed from the lip 168a onto a conveyor 180, supported by a frame 202 and which is adapted to transport the shingles or units from the mechanism.

The yoked arm 182 carries a slide block 184, which is adjustably positioned in the yoke 182 by means of a stud 186. A bar 187 pivotally connected to the block 184, extends rearwardly therefrom, (to the right in Figs. 10 and 11) and connects the block 184 to a Scotch yoke 188, which is carried by a block 189 rotatably mounted on the shaft 103. The yoke 188 carries a roller 190, which rides in a cam groove 191a of a cam disc 191, rigidly secured to the shaft 103. The cam is of such a nature as to cause the bar 187 and the associated mechanism to rock the pan or trough 160, once for each cycle of operation of the trimming mechanism.

The counting mechanism controlling a single action clutch adapted to set the conveyor 180 in motion, when a predetermined number of units are stacked on the latter, will now be described. As the product is carried forward by the pan 160, from the position shown in full lines in Fig. 11, to the position shown in dotted lines, it contacts with an arm 200 (Fig. 14), secured to a rod 201. The shaft 201 is rotatably journalled at its upper end in a block 203, which is pivotally mounted on a stud 204, rigid with a block 205 secured to the frame 82. At its lower end, the shaft is journalled in a swinging plate 206. Pinned to the plate is a plunger 207, mounted in a cylinder 208, which is pivotally mounted in a block 209, secured to the frame 82. A spring 210, one end of which is secured to the plate 206 and the other end to the block 209, retains the rod 201 in its rearmost position (to the left in Fig. 14).

The shaft 201 is normally prevented from rotation by a pawl 214, pinned to the plate 206 and which coacts with a cam portion 213 of the arm 200. As the shaft is rocked forward about the pivot 204, a link 215, pivoted to the shaft at 216, rocks an arm 207, which is pivoted to a stud 219, mounted on the frame 202, on which is pivoted a pawl 220, which advances a ratchet 221 mounted on the stud 219. The ratchet 221 carries a cam 222, which is adapted to coact with an arm 223, pivotally mounted on the frame 202 and which operates an electric switch 225. As the cam swings the arm 223, the switch 225 is thrown into an "on" position, thereby energizing a solenoid, to be hereinafter described. A spring 226 normally acts on the lever 223 to hold the switch 225 in an "off" position.

After the shaft 201 has been acted upon to advance the ratchet one notch, a lip 227 of the pawl 214, is engaged by a stationary stud 228, mounted on the frame 82, thereby swinging the pawl free of the arm 200, and permitting the latter to rotate until it has cleared the product. Springs 230 and 231 act to return the pawl 214 and arm 200, respectively, to their normal positions.

It will be noted that while the shaft 201 is in the active portion of its movement, namely, while it is progressing the ratchet, the arm 200 is in a substantially parallel relationship to the production, and it is not until the shaft 201 has completed the active portion of its movement, that the arm is permitted to rock. This prevents marring or mutilation of the sheet by the counting mechanism.

The single action clutch, which controls the operation of the conveyor 18a, is best illustrated in Figs. 1, 7, 15 and 16. Keyed to the shaft 103 is a sprocket 230, which carries a driving chain 231, coacting with a sprocket 232 to drive the latter continuously. The sprocket 232 is rigidly secured to a bushing 233 loosely mounted on the shaft 106. The bushing 233 has, on its inner surface, a clutch recess 233a, which is adapted to be engaged by a spring pressed plunger 234. The plunger is normally retained in a disengaged position by the bevelled nose 235 of one arm of a bell crank 236, which is pivotally mounted on the frame 80 and coacts with a recess in the plunger 234, thereby restraining the plunger against movement towards the clutch member 233. A spring 237, secured at one end to the frame and at the other end to the bell crank urges the bevelled nose 235 into a groove 239 in a rotor 238, which carries the plunger 234.

A solenoid 250, which is controlled by the switch 225, heretofore described, is connected by suitable linkage to the bell crank 236, and operates to withdraw the bevelled nose 235 from the recess in the plunger 234, thereby making a driving connection between the sprocket 232 and the shaft 106. The plunger 242 of the solenoid 250 is connected by means of a link 241 to one arm 240 of a bell crank 243, pivotally mounted to a frame bracket 239a at 244. Pivotally connected to another arm 246 of the bell crank 243 is a latch 245, which is retained in contact with a pin 246a, rigid with the bell crank 236 by a suitable spring 247.

When the solenoid 250 is energized by the counting mechanism, as heretofore described, it swings the bell crank 243 in a counter-clockwise direction (see Fig. 7), thereby causing the latch 245 to withdraw the bevelled nose 235 of the bell crank from the plunger 234. This causes the plunger 234 to coact with the clutch member 233, thus imparting a rotary movement to the rotor 238 and likewise to the shaft 106.

When the solenoid 250 is energized by the switch 215 of the counting mechanism, it is almost instantly deenergized; hence, it will be seen that the bell crank 243 will return to normal position, almost instantly. This causes the spring 237 to return the bell crank 236 into position to cam the plunger 234 out of contact with the clutch member 233, when the latter has completed one revolution, and likewise returns the bell crank 243 and solenoid plunger 242 to their normal positions.

Rigidly secured to the shaft 106 is a sprocket 275, which, by means of a chain 276, drives a sprocket 277, keyed to a shaft 278, which is mounted in suitable bearings 279 on the frame 202 supporting the conveyor 180. Suitable gearing 281 transmits the rotation of the shaft 278 to a cross shaft 290, which carries sprockets 291, adapted to coact with the conveyor chain 292 to progress the latter.

As each production is discharged from the pan 160 to the conveyor 180, it contacts with the counting mechanism, and when such time as a predetermined number of productions pass the counting mechanism, the solenoid 250 is energized, causing the conveyor 180 to transfer the piles of finished shingles or products and enables the pan 160 to place or stack other products upon the conveyor.

It will be seen from the foregoing description that I have provided a mechanism which will efficiently form and perforate a rough slab. The mechanism described first trims the rough slab to the form indicated by the dot and dash lines W' in Fig. 17, and perforates the slab at P, as indicated in Fig. 18. The formed slab is then scored at the top and bottom, as indicated at W2 in Fig. 19. After the slab has been scored it is split apart at the score into a plurality of finished units W3, as indicated in Fig. 20 and then upended and stacked as illustrated in Fig. 21.

The mechanism is of such a design that the products W3 (Fig. 20) may differ in form and the mechanism is such that as these products are upended in stacks, the stack W4 will contain only units of a uniform shape, such as W5, and the stack W6 will contain units of a different form, as for instance, W7.

I have, therefore, provided a mechanism which will form a slab and thereafter divide the slab into a plurality of units wherein one unit may have a form which differs from the form of other units cut from the same slab and wherein such units are stacked into a plurality of stacks, each stack containing only units having the same form and wherein the stacks are discharged from the machine when they reach a predetermined unit content.

The mechanism described will act continuously to form, perforate, and divide slabs of material into finished product units and thereafter stack the units without necessitating the handling of the units and in such manner as to eliminate waste and wherein the trimmed edges of the finished product will be comparatively uniform.

I claim:

1. In a machine of the character described the combination of a slab material feeding means, a slab trimming means cooperating therewith, means adjacent to and aligned with the trimming means for subsequently effecting division of a slab into a plurality of finished products, and wherein said feeding means acts to progress the material from the trimming means to the dividing means 2. In a machine of the character described the combination of a slab magazine, a slab feeding means cooperating therewith, a slab trimming means, means adjacent to the trimming means for effecting the division of slab into a plurality of finished product and said last named means being so arranged that succeeding slabs entering the trimming means act to eject the preceding slab from the trimmer to the dividing means.

3. In a machine of the character described the combination of a slab feeding means, reciprocating slab trimming means cooperating therewith, means adjacent to the trimming and feeding means for effecting division of a slab into a plurality of finished products, and wherein said feeding means arranged to cause the slab to be progressed from the trimming means to the dividing means.

4. An apparatus of the character d scribed, having in combination a reciprocating means for trimming and perforating a slab of material, means for feeding slabs of material thereto, a rotary mechanism adjacent and in alignment with said reciprocating means for dividing the slabs into a plurality of product units.

5. An apparatus of the character described, having in combination, means for trimming a slab of material, means for feeding slabs of material thereto, a scoring mechanism adjacent to the trimming means for effecting the dividing of the slab into a plurality of product units, and wherein said feeding means acts to progress the slab from the trimming means to the scoring means.

6. An apparatus of the character described, having in combination a reciprocating means for trimming and perforating a slab of material, means for feeding slabs of material thereto, and mechanism adjacent to said reciprocating means for dividing the slab into a plurality of product units, by a scoring and slab breaking operation, and wherein said feeding mechanism acts to cause the slab to be fed from the trimming means to the dividing means.

7. In a machine of the character described, the combination of sheet feeding means with shearing mechanism adapted to trim the sheets to a predetermined size, and subsequently acting means adapted to split each sheet, and wherein said feeding means is adapted to cause each succeeding slab fed to the shearing means to push the preceding slab to the splitting means.

8. In a machine of the character described, the combination of sheet feeding means with shearing mechanism adapted to trim the sheets to a predetermined size, means adapted to split each trimmed sheet into units, said feeding means being effected to move a trimmed sheet from the shearing mechanism to the sheet splitting means.

9. In a machine of the character described, a slab magazine, a slab cooperating therewith, slab feeding means, slab perforating means, and means adjacent to the perforating means adapted to score the perforated slab, and means adapted to impart a sharp blow to the scored slab, whereby slab is divided into a plurality of finished products.

10. In a machine of the character described, the combination of slab feeding means, of a reciprocating head, means adjustably carried by the head to trim the slab, a pair of rotating knives adjacent to the trimming means and adapted to score the slab on the top and bottom faces thereof, and means adapted to divide the scored slab into a plurality of product units.

11. In a machine of the character described, the combination with a slab progressing means, of rotary knives adapted to score the slab on two opposing surfaces, means adapted to interrupt the progress of the slab, and means to split the scored slab while the progress of the slab is interrupted.

12. In a machine of the class described the combination with a slab progressing means, of a slab guide, a slab scoring means associated with such guide adapted to score the slab on two opposing surfaces thereof, slab breaking means adapted to divide the slab along the score, and means adapted thereafter to separate the divided slab.

13. In a machine of the character described, a slab magazine, a slab cooperating therewith, slab feeding means, slab perforating means, and means adjacent to and in alignment with the perforating means adapted to score the perforated slab said feeding means acting to cause the slabs to be fed from the trimming means to the scoring means, a slab guide associated with the scoring means, feed rolls adapted to progress the slab through the perforating means, and a cam controlled arm adapted to impart a sharp blow to the scored slab, whereby the slab is parted into a plurality of finished products.

14. In a machine of the character described, the combination with a slab progressing means, of rotary knives adapted to score the slab on two opposing surfaces, means adapted to interrupt the progress of the slab, and means adapted to impart a sharp blow to the scored slab and thereby split the scored slab into a plurality of units, such means acting when the movement of the slab is interrupted, and means acting thereafter to substantially separate the units.

15. In a machine of the class described, the combination with a slab progressing means, of a rotary slab scoring means adapted to score the slab on top and bottom surfaces, an arm pivotally mounted intermediate its ends and means acting to cause such arm to impart a sharp blow substantially along the entire score and thereby divide the slab into a plurality of finished units.

16. In a machine of the class described, a slab feeding table, a slab magazine mounted on the table and adapted to retain a plurality of slabs in stacked formation, slab forming mechanism comprising a stationary bed and a reciprocating forming head, a carriage mounted on the feed table adapted to feed the bottommost slab from the stack to the bed, said carriage being operative when the forming head is out of contact with the bed, a slab dividing means adjacent to the forming mechanism and adapted to divide the slab into a plurality of finished units, said dividing means so arranged that each succeeding slab fed to the forming mechanism ejects the preceding slab from the forming mechanism into the dividing means.

17. In a machine of the class described, slab feeding means, slab forming means including a trimming shear, a pair of rotary scoring knives adjacent to and in alignment with the forming mechanism, means including said sheet feeding means adapted to progress the formed slab through the bite of the scoring knives, discharge mechanism adapted to discharge the products from the machine, continuously acting means associated with the scoring acting to progress the formed slab to the discharge means, cam actuated means adapted to interrupt the progress of the slab, a bar associated with the slab progressing means and adapted to impart a sharp blow to the scored slab, and means to prevent excessive movement of the slab due to such blow.

In testimony whereof, I hereunto affix my signature.

THEODORE H. EICKHOFF.